United States Patent [19]

Odegaard

[11] Patent Number: 4,834,445
[45] Date of Patent: May 30, 1989

[54] COVER DEPLOYMENT APPARATUS

[76] Inventor: Danny E. Odegaard, R.R. 1, Box 185, Cavalier, N. Dak. 58220

[21] Appl. No.: 135,919

[22] Filed: Dec. 21, 1987

[51] Int. Cl.$^4$ .............................................. B60J 11/00
[52] U.S. Cl. ..................................... 296/98; 160/245; 242/86.52
[58] Field of Search ................... 296/98, 100; 242/86.52 X; 160/245 X, 122, 246, 291

[56] References Cited

U.S. PATENT DOCUMENTS

| | | | |
|---|---|---|---|
| 31,746 | 11/1984 | Dimmer | 296/98 |
| 481,954 | 9/1892 | Jewel | 296/98 |
| 1,186,388 | 6/1916 | Fountain | 296/100 |
| 1,318,820 | 10/1989 | Watkins | 296/100 |
| 1,322,326 | 11/1919 | Miller | 296/98 |
| 1,538,384 | 5/1925 | Crockett et al. | 296/100 |
| 2,510,307 | 6/1950 | Daniels | 296/100 |
| 2,591,186 | 4/1952 | Neitzke | 296/100 |
| 3,667,802 | 6/1972 | Love | 296/98 |
| 3,829,548 | 8/1974 | Becknell | 296/98 |
| 3,854,770 | 12/1974 | Grise et al. | 296/98 |
| 3,977,719 | 8/1976 | Thurston | 296/98 |
| 4,030,780 | 6/1977 | Petretti | 296/98 |
| 4,050,734 | 9/1977 | Richard | 296/98 |
| 4,225,175 | 9/1980 | Fredin | 296/98 |
| 4,234,224 | 11/1980 | Rosenvold | 296/98 |
| 4,380,350 | 4/1983 | Block | 296/98 |
| 4,484,777 | 11/1984 | Michel | 296/98 |
| 4,505,512 | 3/1985 | Schmerchel et al. | 296/98 |
| 4,518,139 | 5/1985 | Heider et al. | 296/98 |

Primary Examiner—Robert R. Song
Attorney, Agent, or Firm—Merchant, Gould, Smith, Edell, Welter & Schmidt

[57] ABSTRACT

An apparatus is disclosed for a cover assembly where the assembly includes an elongated body having first and second opening defining edges which define an elongated opening within the body. A covering material is provided sized to cover the opening with a first edge of the material attached to the body and a second edge of the material attached to an elongated bar. The apparatus includes a motor for selectively rotating the bar about the axis in first and second rotational directions to wind and unwind material from the bar. A tensioning mechanism is provided for urging the bar member to move in a direction with the bar member and tarp covering the opening.

5 Claims, 2 Drawing Sheets

COVER DEPLOYMENT APPARATUS

BACKGROUND OF THE INVENTION

1. Field of the Invention

This invention pertains to a cover deployment apparatus for a roll-up tarp assembly. More particularly, this invention pertains to such a cover deployment apparatus which includes means for automatically deploying a tarp.

2. Description of the Prior Art

Roll-up tarp assemblies for open truck boxes for trailers are well known. Copies of such are shown in U.S. Pat. No. 4,505,512 and U.S. Pat. No. 4,302,043 (Reissued on Nov. 27, 1984 as No. Re. 31,746).

As shown in the aforementioned prior art patents, roll-up tarp cover assemblies were provided for elongated open truck boxes. One edge of a tarp is attached to an edge of the truck box opening. The other edge of the tarp is secured to a bar member. As the bar member is rotated about its axis in either a first or second rotational direction, the tarp is either wound onto or unwound from the bar member. Illustrated most clearly in U.S. Pat. No. 4,302,043 (Re. No. 31,746) the tarp is deployed or wound up by means of a hand crank which is used to rotate the tarp supporting bar member. Such a procedure presents undesirable consequences. For example, due to the weight of the tarp, the hand crank operation may be difficult and cumbersome. Also, the crank tool must be separately housed and becomes an item which can be damaged or misplaced.

An additional problem associated with such prior art appratus is presented by use of the tarp supporting mechanisms used in the truck trailors. For example, as shown in the aforementioned U.S. Pat. No. 4,302,043 (No. Re. 31,746) the truck trailer includes a plurality of transverse bows on which the tarp rests when it is deployed. The presence of these bows are an obstacle to loading and unloading of the trailer. Accordingly, it would be desirable to eliminate the need for the bows.

SUMMARY OF THE INVENTION

According to the preferred embodiment of the present invention an apparatus is disclosed for a cover assembly for an elongated body having an opening defined between first and second edges. The covering assembly includes a flexible covering material sized to cover the opening with a first edge of the material attached to the body and with a second edge of the material attached to a longitudinal bar. Motive power means are provided for selectively rotating the bar about its axis to roll or unroll material onto or from the bar. A mounting assembly is provided for mounting the motive power means to the truck body with the motive power means movable to follow the path the bar travels during ravelling and unravelling of the tarp. A tension means is provided for urging the bar member toward the fully deployed position.

DESCRIPTION OF THE PREFERRED EMBODIMENT

Figure 1:
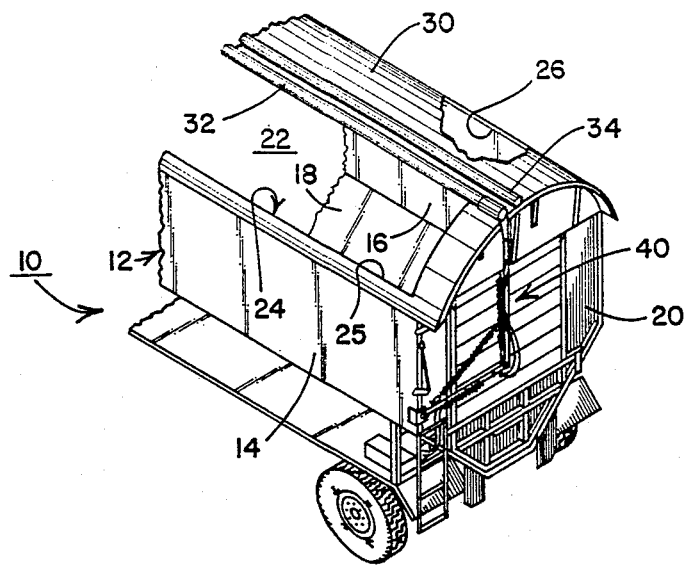
FIG. 1 is a perspective view of a truck trailer including an apparatus of the present invention.

Referring now to the several drawing figures in which identical elements are numbered identically throughout, a description of the invention will now be given with respect to a preferred embodiment. In FIG. 1, a truck trailer is shown generally at 10. The trailer body 12 includes side walls 14 and 16, bottom wall 18 and end wall 20 all cooperating to define a trailer bin 22. The bin 22 includes an upper opening 24 defined between side walls 14 and 16. For example, bin 22 extends between left edge 25 and right edge 26. As shown in the figures, back wall 20 includes a convex upper edge 21.

A tarp 30 of flexible material is provided and includes one edge which is secured to the body 12 adjacent edge 26. A longitudinal bar member 32 is provided with its longitudinal axis extending generally parallel between edges 24 and 26. A second end of the tarp 30 is attached to bar member 32. Bar member 32 is rotatable about its axis such that when it is rotated in a clockwise direction (when viewed in the figures) the material of tarp 30 is urged to wind upon bar 32. Similarly, when bar 32 is rotated in a counter-clockwise direction (when viewed in the figures) material which is collected on the bar 32 tends to unwind and thereby cover opening 24.

Figure 2:
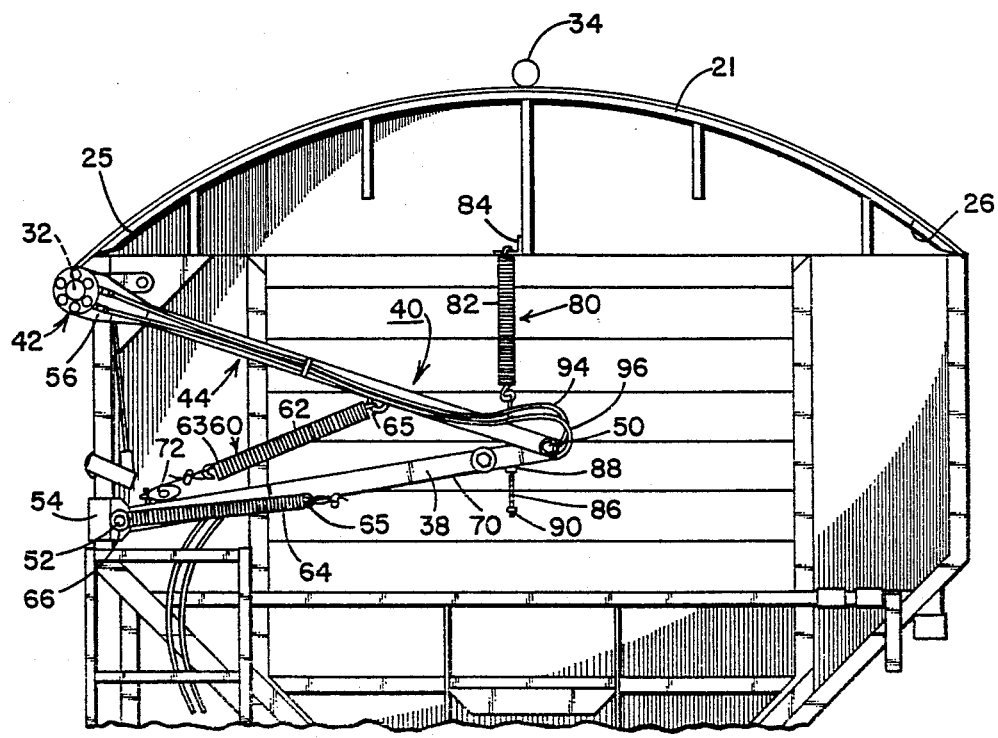
FIG. 2 is a view taken in elevation of the apparatus of the present invention showing a tarp in a fully covered position.

Unlike the trailer bodies described in the aforementioned patents, the bin 22 is not obstructed by cross bows. Instead, the tarp 30 is supported by a centrally positioned support rod 34. Support rod 34 is in the form of a longitudinal tube extending generally parallel to bar member 32. Support rod 34 is physically attached to the tarp 30 such that when the tarp is deployed covering opening 24, support rod 34 is disposed centrally positioned above the bin and resting on the center of rear wall edge 21 (as shown in FIGS. 1 and 2). Bar 34 is positioned on the surface of tarp 30 such that the tarp 30 is positioned between bar 34 and edge 21 when the tarp is fully displayed as shown in FIG. 2.

Figure 3:
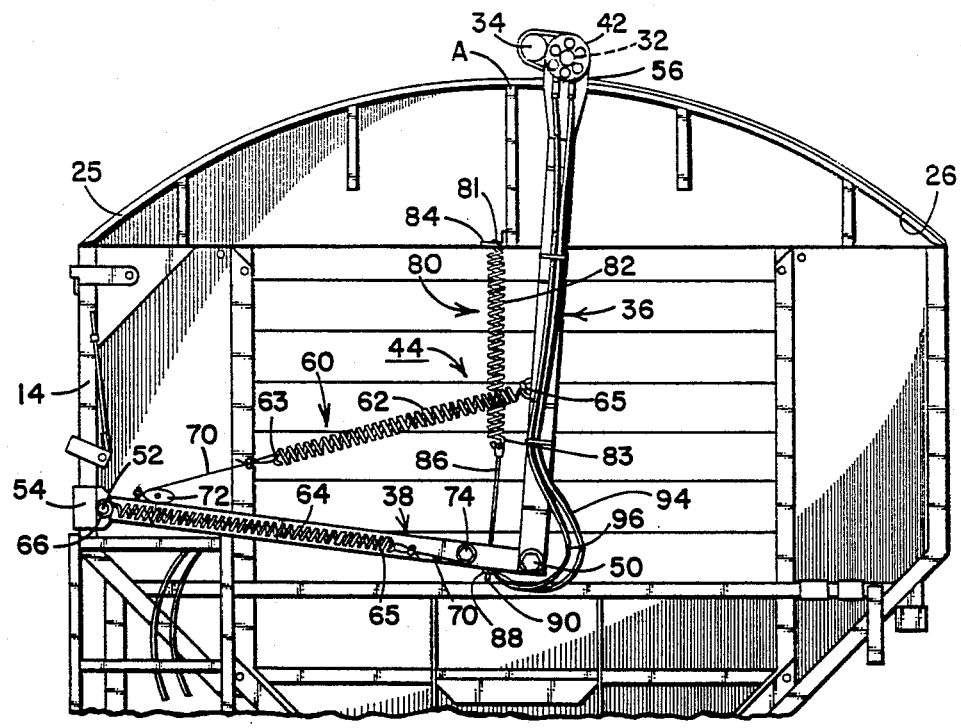
FIG. 3 is the view of FIG. 2 showing the tarp in approximately half-covered position.
Figure 4:
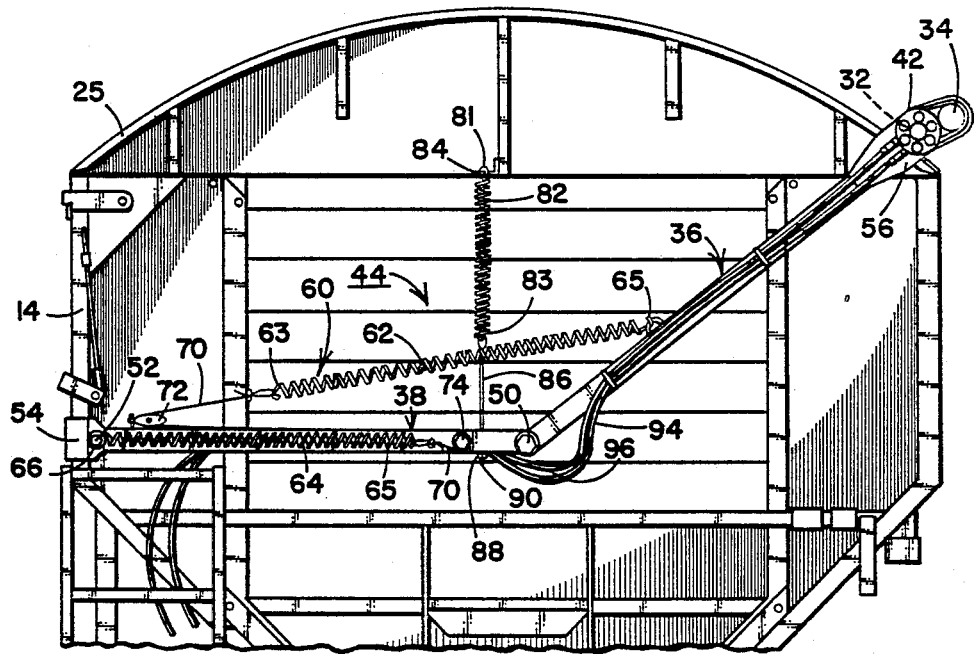
FIG. 4 is the view of FIG. 3 showing the tarp in the fully opened position.

A cover deployment apparatus is provided and is shown most clearly in FIGS. 2-4. The apparatus includes a hydraulic motor 42 and a mounting mechanism 44.

Motor 42 is a conventional rotary hydraulic motor and is coupled to the end of bar member 32 in any suitable manner such that rotation of hydraulic motor 42 in a clockwise or counter-clockwise direction results in a concurrent rotational movement of bar member 32 about its longitudinal axis. Hydraulic motor 42 is connected to the bar member 32 such that the hydraulic motor 42 will follow the bar member 32 as it moves in its path between edges 24 and 26. (For purposes of this application, the term "motive power means" means to motor 42 or may also refer to any apparatus intended to urge rotation of bar 32. For example, the motor 42 could be mounted spaced from bar 32 and coupled thereto by a gear. In such a case, the gear would be a "motive power means" which would travel with the bar 32.)

The mounting mechanism 44 includes a first mounting arm 36 and second a mounting arm 38. Adjoining ends of first mounting arm 36 and second mounting arm 38 are connected by a pivot pin connection 50. An end of second mounting arm 38 opposite pivot pin connection 50 is pivotally connected by means of a pivot pin 52 to a mounting bracket 54 which, in turn, is rigidly connected to sidewall 14. First mounting arm 36 extends from pin connection 50 to a free end 56 on which is mounted hydraulic motor 42. First mounting arm 36 and second mounting arm 38 are dimensioned so that free end 52 and hydraulic motor 42 is free to follow the path of bar member 32 as it moves between edges 25 and 26 and thereby transverses opening 24.

A first tensioning means 60 is provided to urge the free end 56 of the first mounting arm 36 toward edge 25 (with first mounting arm 36 assuming the position shown in FIG. 2). Tensioning means 60 includes a network of two springs 62 and 64. First spring 62 is rogodly connected to first mounting arm 36 by means of a spring connection point 65. Similarly, second spring 64 has an end fixidly connected to mounting bracket 54 by means of a connection point 66. Free ends 63 and 65 of spring 62, 64, respectively, are connected by means of a cable 70 secured to each of ends 63, 65 with the cable entrained around a pair of pulleys 72, 74 with pullys 72 and 74 being fixidly connected to second mounting arm 38. As shown in FIGS. 2-4, the spring and pulley system of first tension means 60 are disposed such that as free end 56 moves toward edge 26 (with a fully extended position being as shown in FIG. 4) tension on the springs 62, 64 increase to urge the free end 56 in a direction back to the position shown in FIG. 2.

A second tensioning means 80 includes a spring 82 with a first end 81 rigidly connected to back wall 20 by means of a mounting bracket 84. A rigid rod 86 depends from a second end 83 of spring 82. A cylindrical tube 88 is carried on second mounting arm 38. Tube 88 is aligned to slidably receive rod 86. A stop 90 is disposed on a free end of rod 86 and sized to oppose tube 88. A pair of hydraulic lines 94 and 96 provide supply and venting of hydraulic fluid to motor 42.

Having now described the structure of the invention, the features and benefits of the present invention can best be illustrated with reference to an operation example. When the tarp is originally in a completely rolled up position and bin opening 24 is exposed, the apparatus is in the fully extended position shown in FIG. 4. In this position, springs 62 and 64 are fully extended presenting maximum tension to urge free end 56 of first mounting arm 36 toward edge 25. In this position, second mounting arm 38 is generally horizontal and is providing a mild tension on spring 82. When the hydraulic motor 42 is actuated to rotate bar member 32 in a counter-clockwise direction (when viewed in FIGS. 2-4) tarp material 30 is urged to unwind from bar 32. This rotational motion together with the tension of spring 62 and 64 urges the free and 56 to move toward edge 25 as the tarp 30 unwinds. Also, the tension springs 62 and 64 cooperates with the rotation of the bar member to keep the tarp taut as it unwinds.

As the tarp unwinds and the free end 56 moves toward the center or apex A of roof edge 21, the point is reached where the support rod 34 is unravelled from the bar member 32 and is deposited with its tarp on the apex A of the wall edge 21. FIG. 3 shows the positioning of the support arms just before depositing of support bar 34.

As illustrated most clearly in FIG. 3, the length of first mounting arm 36 is such that when free end 56 approaches the apex A, the length of mounting arm 36 urges second mounting arm 38 downwardly. The tube 88 contacts stop 90 and urges rod 86 downwardly to increase the tension on spring 82. This increase in tension of spring 82 cooperates with the rotation of the bar member 32 to lift the entire bar member 32 and its enrolled tarp over support rod 34. Absent the increase of tension provided by spring 82, the tarp would simply rest up against support rod 34 and would unravell the tarp without movement of the bar toward edge 25. As it is, with the assistance of the tension of spring 82, bar member 32 can clear support rod 34 and freely move toward edge 25 to the position shown in FIG. 2.

When the appratus is in the position of FIG. 2, the tarp 30 completely covers bin 22. The support rod 34 supports the tarp along the apex A and thereby prevents sagging of the tarp 30. As a result, transverse bows as found in the prior art are not necessary. When it is desirable to expose the bin 22, the rotational direction of the motor 32 is reversed so that it rotates in a clockwise direction when viewed in FIGS. 2-4. As motor 42 rotates the bar 32 in the clockwise direction, tarp is rolled up onto the bar with the result that the free end 56 is urged to travel toward edge 26. Springs 62 and 64 are selected such that their tensioning will yield to the urging of the motor 42 winding up the tarp to move free end 56 toward edge 26.

As the tarp is being rolled onto bar 32, the bar 32 approaches support rod 34. As it approaches support bar 34, arm 36 has moved arm 38 downwardly thereby increasing tension on spring 82. When the bar 32 approaches support rod 34, the tension in spring 82 together with the rotation of the motor 42 cooperate to lift the bar 32 over rod 34 and permit completion of the rolling up of the tarp to the position shown in FIG. 4.

An additional advantage of the present invention is that the bin 22 can be filled unevenly. That is, material (such as potatoes or the like) which are intended to be stored within the bin 22 could be deposited such that they would slightly extend above the normal roof level of the truck trailer. The tensioning of the spring 82 will help in movement of the bar 32 over unevenness of the roof surface resulting from such overfill.

From the foregoing, it has been shown how the present invention provides for automatic rolling and unrolling of a tarp with a trailer roof. Also, the present invention permits use of a trailer which does not have the obstructing transverse bows.

From the foregoing detailed description of the present invention, it has been shown how the objects of the invention have been obtained in a preferred manner. However, modifications and equivalents of the disclosed concepts such as readily occurred to those skilled in the art, are intended to be included within the scope of this invention. Thus, the scope of this invention is intended to be limited only by the scope of the claims as are or may hereafter be appended hereto.

I claim:

1. An apparatus for a cover assembly wherein said assembly includes an elongated body having first and second opening defining edges defining an elongated opening within said body, a flexible covering material sized to cover said opening with a first edge of said material attached to said body adjacent said first opening defining edge, an elongated bar member having a longitudinal axis and disposed to transverse a path between said first and second opening defining edges, said bar member rotatable about said axis as said bar member traverses said path, means for attaching a second edge of said covering material to said bar member with said material urged to wind onto said bar member when said bar member is rotated in a first rotational direction, said material being urged to unwind from said bar member when said member is rotated in a second rotational direction, a deployment apparatus for said cover comprising:

motive power means for selectively rotating said bar member about said axis in either of said first and second rotational directions; mounting means for mounting said motive power means to said body with said motive power means movable to follow said bar member as said bar member moves along said path, said motive power means coupled to aid bar member in force transmitting relation to urge said bar member to move along said path away from said first opening defining edge in response to a force acting on said motive power means to urge said motive power means away from said first opening defining edge;

first tension means for urging said bar member toward said second opening defining edge; and second tension means for providing an urging force on said motive power means in a direction away from said body whereby said motive power means can be selectively activated to rotate said bar member in said first rotational direction with material winding onto said bar member and drawing said bar member toward said first opening defining edge to expose said opening and whereby said motive power means can be selectively activated to rotate said bar member in said second rotational direction with material unwinding from said bar member with said first tension means urging said bar member toward said second opening defining edge to cover said opening.

2. An apparatus according to claim 1 wherein said first tension means is selected to yield to movement of said bar member toward said first opening defining edge in reponse when said bar member is rotating in said first rotational direction and winding material on said bar member.

3. An apparatus for a cover assembly wherein said assembly includes an elongated body having first and second opening defining edges defining an elongated opening within said body, a flexible covering material sized to cover said opening with a first edge of said material attached to said body adjacent said first opening defining edge, an elongated bar member having longitudinal axis and disposed to traverse a path between said first and second opening defining edges, said member rotatable about said axis as said bar member traverses said path, means for attaching a second edge of said covering material to said bar member with said material urged to wind onto said bar member when said bar member is rotated in a first rotational directional, said material being urged to unwind from said bar member when said member is rotated in a second rotational direction, a deployment apparatus for said cover comprising;

motive power means selectively rotating said bar member about said axis in either of said first and second rotational directions;

mounting means for mounting said motive power means to said body with said motive power means movable to follow said bar member as said bar member moves along with said path, said motive power means coupled to said bar member in force transmitting relation to urges said bar member to move along said path away from said first opening defining edge in response to a force acting on said motive power means to urge said motive power means away from said first opening defining edge;

said mounting means including a first mounting arm connected to said motive power means and a second mounting arm having a first end pivotally connected to said body, means for pivotally connecting said first mounting arm to said second mounting arm at a pivot axis;

first tension means for urging said bar member toward said second opening defining edge, said first tension means including resiliently biased means for urging said first mounting arm to pivot about said pivot axis toward said second opening defining edge;

second tensioning means operatively connected to said second mounting arm and resiliently biased to urge said pivot axis toward a plane of said opening.

4. An apparatus according to claim 3 wherein said tarp includes a longitudinal support bar secured thereto with said support bar disposed to be positioned on said body in a predetermined location when said tarp is unwound onto said body covering said opening.

5. An apparatus according to claim 4 wherein said second tension means is disposed to urge said pivot axis and said first mounting arm to raise said bar member over said support rod when said first mounting arm is disposed in a location adjacent a predetermined position.

* * * * *

UNITED STATES PATENT AND TRADEMARK OFFICE
CERTIFICATE OF CORRECTION

PATENT NO. : 4,834,445
DATED : May 30, 1989
INVENTOR(S) : Danny Edwin Odegaard

It is certified that error appears in the above-identified patent and that said Letters Patent is hereby corrected as shown below:

Column 3, lines 12-13, "rogodly" should be --rigidly--;

Column 4, line 37, "uneveness" should be --unevenness--;

Column 5, line 48, after "said" (2nd), insert --bar--;

Column 6, line 9, after "means", insert --for--; and

Column 6, line 15, delete "with".

Signed and Sealed this

Twentieth Day of March, 1990

Attest:

JEFFREY M. SAMUELS

Attesting Officer     Acting Commissioner of Patents and Trademarks